US011303689B2

(12) United States Patent
Mate et al.

(10) Patent No.: US 11,303,689 B2
(45) Date of Patent: Apr. 12, 2022

(54) METHOD AND APPARATUS FOR UPDATING STREAMED CONTENT

(71) Applicant: Nokia Technologies Oy, Espoo (FI)

(72) Inventors: Sujeet Shyamsundar Mate, Tampere (FI); Arto Juhani Lehtiniemi, Lempaala (FI); Antti Johannes Eronen, Tampere (FI); Jussi Artturi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 219 days.

(21) Appl. No.: 15/614,811

(22) Filed: Jun. 6, 2017

(65) Prior Publication Data
US 2018/0352018 A1 Dec. 6, 2018

(51) Int. Cl.
*H04L 29/06* (2006.01)
*H04L 12/26* (2006.01)
(Continued)

(52) U.S. Cl.
CPC .............. *H04L 65/80* (2013.01); *G11B 27/00* (2013.01); *H04L 43/0852* (2013.01);
(Continued)

(58) Field of Classification Search
CPC .. H04N 21/2368; H04N 21/439; H04N 29/06; H04N 5/247; H04N 13/366; H04N 21/4334; H04N 5/783; H04N 9/8211; H04N 21/4223; H04N 21/233; H04N 21/4781; H04N 21/6125; H04N 21/23439; H04N 21/2662; H04N 19/136; H04N 21/2187; H04N 5/60; H04N 7/08; H04N 9/3194; H04N 7/185; H04N 7/188; H04S 7/00;
(Continued)

(56) References Cited

U.S. PATENT DOCUMENTS 8,396,576 B2    3/2013  Kraemer et al.
9,277,122 B1 *  3/2016  Imura ....................... G06T 7/73
(Continued)

FOREIGN PATENT DOCUMENTS

EP         2824663 A2    1/2015
WO    2016/018787 A1    2/2016
(Continued)

*Primary Examiner* — Backhean Tiv
*Assistant Examiner* — Linh T. Nguyen
(74) *Attorney, Agent, or Firm* — Harrington & Smith; Joseph C. Drish

(57) ABSTRACT

A method including capturing, by a low latency monitoring device, content visualized in video rendering mode, capturing at least one parameter modified in the video rendering mode, determining at least one correction update message for modifying the captured content based on the at least one captured parameter modified in the video rendering mode, determining a content production stream based on the captured content, sending the content production stream to a receiver device, and sending the at least one correction update message to the receiver device, wherein the at least one correction update message is configured to be used by the receiver device to retroactively fix an audio rendering of the captured content based on aligning the content production stream and the at least one captured parameter modified in the video rendering mode.

27 Claims, 11 Drawing Sheets

(51) Int. Cl.
| | | |
|---|---|---|
| *H04N 7/08* | (2006.01) | |
| *H04N 5/60* | (2006.01) | |
| *G11B 27/00* | (2006.01) | |
| *H04L 29/08* | (2006.01) | |
| *H04L 65/80* | (2022.01) | |
| *H04L 43/0852* | (2022.01) | |
| *H04L 65/613* | (2022.01) | |
| *H04L 65/60* | (2022.01) | |
| *H04L 67/52* | (2022.01) | |
| *H04L 67/131* | (2022.01) | |

(52) U.S. Cl.
CPC ........ *H04L 65/4092* (2013.01); *H04L 65/601* (2013.01); *H04L 67/18* (2013.01); *H04N 5/60* (2013.01); *H04N 7/08* (2013.01); *H04L 67/38* (2013.01)

(58) Field of Classification Search
CPC .. H04S 2400/15; H04S 2400/11; H04S 7/303; H04S 7/304; H04S 2400/13; H04S 3/008; H04S 7/40; H04S 2420/01; H04S 2400/01; H04S 7/305; H04S 7/301; H04S 7/302; G06T 19/00; G06T 13/205; G06F 3/01; G06F 3/16; G06F 3/011; G06F 3/00; G06F 3/005; G06F 3/012; G06F 3/162; G06F 3/04815; G06F 3/167; G06F 16/60; G06F 16/70; G06K 9/00; G02B 27/01; G11B 27/031; G11B 20/10; G11B 27/00; H04L 65/1089; H04L 65/4076; H04L 65/80; H04L 65/602; H04L 65/604; H04L 65/607; H04L 43/0852; H04L 65/4092; H04L 65/60; H04L 65/601; H04L 47/2416; H04L 47/29; H04L 67/02; H04L 67/18; H04L 67/2804; H04L 67/14; H04W 4/043; H04W 4/80; H04W 88/02; H04R 3/005; H04R 1/406; H04R 5/02; H04R 29/006; H04R 3/12; A63F 13/12; H04H 20/18
USPC ........................ 386/223, 227, 278; 345/633
See application file for complete search history.

(56) References Cited

U.S. PATENT DOCUMENTS

| | | | | |
|---|---|---|---|---|
| 9,363,569 | B1 | 6/2016 | Van Hoff et al. | 386/201 |
| 9,473,758 | B1 | 10/2016 | Long et al. | 386/223 |
| 9,584,899 | B1* | 2/2017 | Klimanis | H04R 1/1083 |
| 9,794,720 | B1* | 10/2017 | Kadri | H04S 7/301 |
| 10,110,814 | B1* | 10/2018 | Day | G06T 3/0018 |
| 2009/0217166 | A1* | 8/2009 | Kojo et al. | G06F 3/084 |
| | | | | 715/713 |
| 2010/0166058 | A1* | 7/2010 | Perlman | H04L 67/38 |
| | | | | 375/240.02 |
| 2012/0206452 | A1 | 8/2012 | Geisner et al. | 345/419 |
| 2013/0236040 | A1 | 9/2013 | Crawford et al. | 381/310 |
| 2013/0279886 | A1* | 10/2013 | Benzaia | H04N 21/47214 |
| | | | | 386/296 |
| 2013/0321670 | A1* | 12/2013 | Zander | H04N 5/23293 |
| | | | | 348/240.99 |
| 2015/0195525 | A1* | 7/2015 | Sullivan | H04N 19/139 |
| | | | | 375/240.02 |
| 2015/0208156 | A1 | 7/2015 | Virolainen | H04R 1/08 |
| 2015/0301592 | A1 | 10/2015 | Miller | G06F 3/011 |
| 2015/0332663 | A1 | 11/2015 | Jot et al. | |
| 2015/0358654 | A1* | 12/2015 | Zhang | H04N 21/4305 |
| | | | | 725/62 |
| 2016/0050360 | A1* | 2/2016 | Fisher | G03B 17/561 |
| | | | | 348/207.11 |
| 2016/0080684 | A1* | 3/2016 | Farrell | H04N 9/8211 |
| | | | | 386/227 |
| 2016/0088280 | A1 | 3/2016 | Sadi et al. | H04N 13/0022 |
| 2016/0163321 | A1 | 6/2016 | Arnott et al. | |
| 2016/0191893 | A1* | 6/2016 | Gewickey | H04N 13/388 |
| | | | | 386/223 |
| 2016/0266865 | A1 | 9/2016 | Tsingos et al. | |
| 2016/0309277 | A1* | 10/2016 | Hiscock | H04S 7/302 |
| 2016/0323653 | A1* | 11/2016 | Chen | H04N 21/6587 |
| 2016/0361646 | A1* | 12/2016 | Perry | A63F 13/497 |
| 2017/0105038 | A1* | 4/2017 | Subramanya | G11B 27/36 |
| 2017/0133036 | A1* | 5/2017 | Cohen | G06T 7/73 |
| 2017/0200474 | A1* | 7/2017 | Gudewicz | G11B 27/036 |
| 2017/0243402 | A1* | 8/2017 | Daniels | G06T 19/00 |
| 2017/0251181 | A1* | 8/2017 | Smolyanskiy | G05D 1/005 |
| 2017/0279426 | A1* | 9/2017 | Dizon | H03G 3/02 |
| 2017/0295446 | A1* | 10/2017 | Thagadur Shivappa | G06F 3/011 |
| 2017/0323018 | A1* | 11/2017 | Angelova | H04L 43/18 |
| 2017/0347136 | A1* | 11/2017 | Frantz | H04N 21/44004 |
| 2018/0040164 | A1* | 2/2018 | Newman | G06T 19/00 |
| 2018/0124370 | A1* | 5/2018 | Bejot | G11B 27/036 |
| 2018/0150275 | A1* | 5/2018 | Mate | G06F 3/165 |
| 2018/0192075 | A1* | 7/2018 | Chambers | H04N 19/59 |
| 2018/0199094 | A1* | 7/2018 | Jeong | H04N 19/42 |
| 2018/0218541 | A1* | 8/2018 | Brown, III | H04S 7/303 |
| 2018/0220166 | A1* | 8/2018 | Meyer | H04N 21/2187 |
| 2018/0234612 | A1* | 8/2018 | Kunkel | G06T 7/70 |
| 2018/0302659 | A1* | 10/2018 | Srinivasan | H04N 21/2343 |
| 2018/0315199 | A1* | 11/2018 | Socek | G06T 7/194 |
| 2018/0329669 | A1* | 11/2018 | Becker | H04N 21/8547 |
| 2018/0329671 | A1* | 11/2018 | Einziger | G06F 3/162 |
| 2018/0352018 | A1* | 12/2018 | Mate | H04L 67/18 |
| 2019/0116395 | A1* | 4/2019 | Kerdranvat | H04N 21/8106 |
| 2019/0182554 | A1* | 6/2019 | Schupak | H04L 65/608 |
| 2019/0215349 | A1* | 7/2019 | Adams | A63F 13/54 |
| 2019/0335288 | A1* | 10/2019 | Latypov | H04S 3/008 |
| 2020/0162796 | A1* | 5/2020 | Azuolas | H04N 21/23439 |

FOREIGN PATENT DOCUMENTS

| | | |
|---|---|---|
| WO | WO-2016/024892 A1 | 2/2016 |
| WO | WO-2016/164178 A1 | 10/2016 |

\* cited by examiner

METHOD AND APPARATUS FOR UPDATING STREAMED CONTENT

BACKGROUND

Technical Field

The exemplary and non-limiting embodiments relate generally to content capture, monitoring and delivery.

Brief Description of Prior Developments

VR capture systems are known to require low latency monitoring to ensure an acceptable quality of the output production stream. Augmented reality (AR) monitoring of VR capture operation is a process which allows immediate feedback about the effects of audio mixing or camera parameter changes. Through an AR device, the audio or video engineer may monitor the capture scene (consisting of sound source information with high-accuracy-indoor-positioning (HAIP) tags, in case of tracked sources) and adjust their properties. The VR production stream may have larger latency than AR monitoring (reaching into multiple seconds, for example). The VR production stream may continuously deliver content even as the content is being monitored and modified.

SUMMARY

The following summary is merely intended to be exemplary. The summary is not intended to limit the scope of the claims.

In accordance with one aspect, an example method comprises capturing, by an augmented reality (AR) device, content visualized in AR mode, capturing parameters modified in the AR mode, determining at least one correction update message for modifying the capture parameters based on the captured parameters modified in the AR mode, determining a VR content production stream based on the captured content, and sending the at least one correction update message and the content stream to a receiver device, wherein the receiver device is configured to retroactively fix an audio rendering of the content based on aligning the VR content production stream and the captured parameters modified in the AR mode.

In accordance with another aspect, an example apparatus comprises at least one processor; and at least one non-transitory memory including computer program code, the at least one memory and the computer program code configured to, with the at least one processor, cause the apparatus to: capture, by an augmented reality (AR) device, content visualized in AR mode, capturing parameters modified in the AR mode, determine at least one correction update message for modifying the capture parameters based on the captured parameters modified in the AR mode, determine a VR content production stream based on the captured content, and send the at least one correction update message and the content stream to a receiver device, wherein the receiver device is configured to retroactively fix an audio rendering of the content based on aligning the VR content production stream and the captured parameters modified in the AR mode.

In accordance with another aspect, an example apparatus comprises a non-transitory program storage device readable by a machine, tangibly embodying a program of instructions executable by the machine for performing operations, the operations comprising: capturing, by an augmented reality (AR) device, content visualized in AR mode, capturing parameters modified in the AR mode, determining at least one correction update message for modifying the capture parameters based on the captured parameters modified in the AR mode, determining a VR content production stream based on the captured content, and sending the at least one correction update message and the content stream to a receiver device, wherein the receiver device is configured to retroactively fix an audio rendering of the content based on aligning the VR content production stream and the captured parameters modified in the AR mode.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
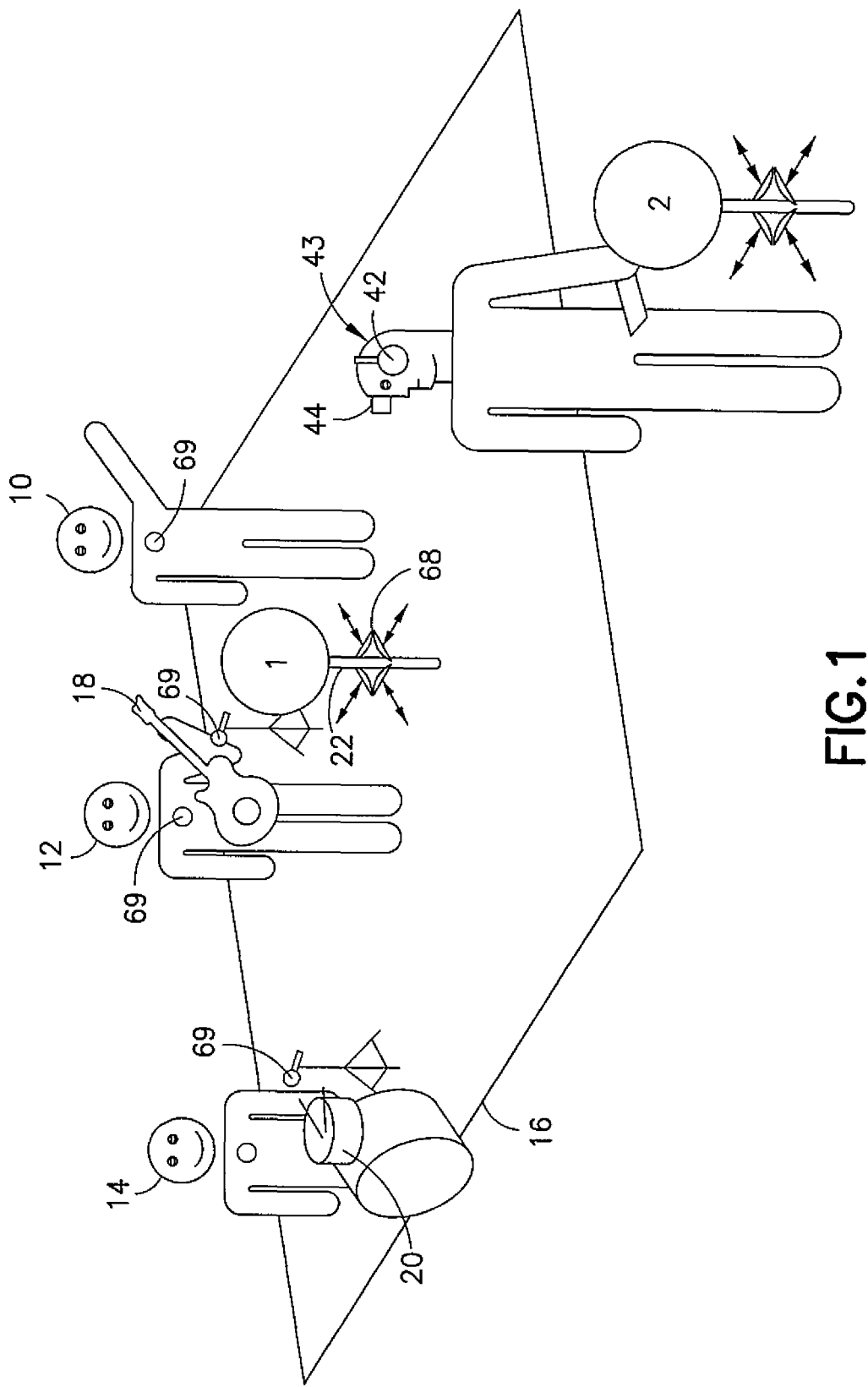
FIG. 1 is a diagram illustrating an event and recording situation.

Referring to FIG. 1, there is shown a diagram illustrating an event and recording situation incorporating features of an example embodiment. Although the features will be described with reference to the example embodiments shown in the drawings, it should be understood that features can be embodied in many alternate forms of embodiments. FIG. 1 presents an event which is captured with distributed audio capture set up. The capture set up consists of one or more close-up microphones for sound sources of interest and microphone array(s) to capture the event space.

In contrast with the legacy production techniques with limited field of view (FOV) cameras, omnidirectional cameras are capturing the whole scene. The systems and methods described herein provide flexibility to improve a particular camera view before any changes in the selection of a current camera for transmission are applied.

The example situation of FIG. 1 comprises musical performers 10, 12, 14 located in an event space 16. Some of the performers 10, 12 comprise musical instruments 18, 20. The situation in the event space 16 is configured to be recorded by a device 22. The device 22 preferably comprises at least one microphone array and perhaps also at least one camera for video recording.

As seen in FIG. 1, the user 40 has two headsets; headphones 42 and a virtual reality (VR) or augmented reality (AR) headset 44. In alternate example embodiments, any suitable audio and video devices for the user 40 to hear audio sound and view a virtual reality (VR) or augmented reality (AR) rendering could be provided. The headphones 42 and reality headset 44 could be a single device or multiple devices for example.

The event situation in the event space 16, such as a musical concert for example, may be visually viewed by the user 40 through the visor of the AR monitor 43. Alternatively, if the user 40 is using a VR monitor, the musical concert may be visually viewed by the user 40 on the visor of the VR monitor where the displayed images are captured, such as via the cameras of the device 22 for example. The user 40 may move his/her head to change the field of view he/she is viewing, such as from the performer 10 to the performer 14 for example. Similarly, when the user moves his/her head, the audio signals played on the headphones 42 or speakers 56 may also change to adjust for a more realistic experience.

Figure 2:
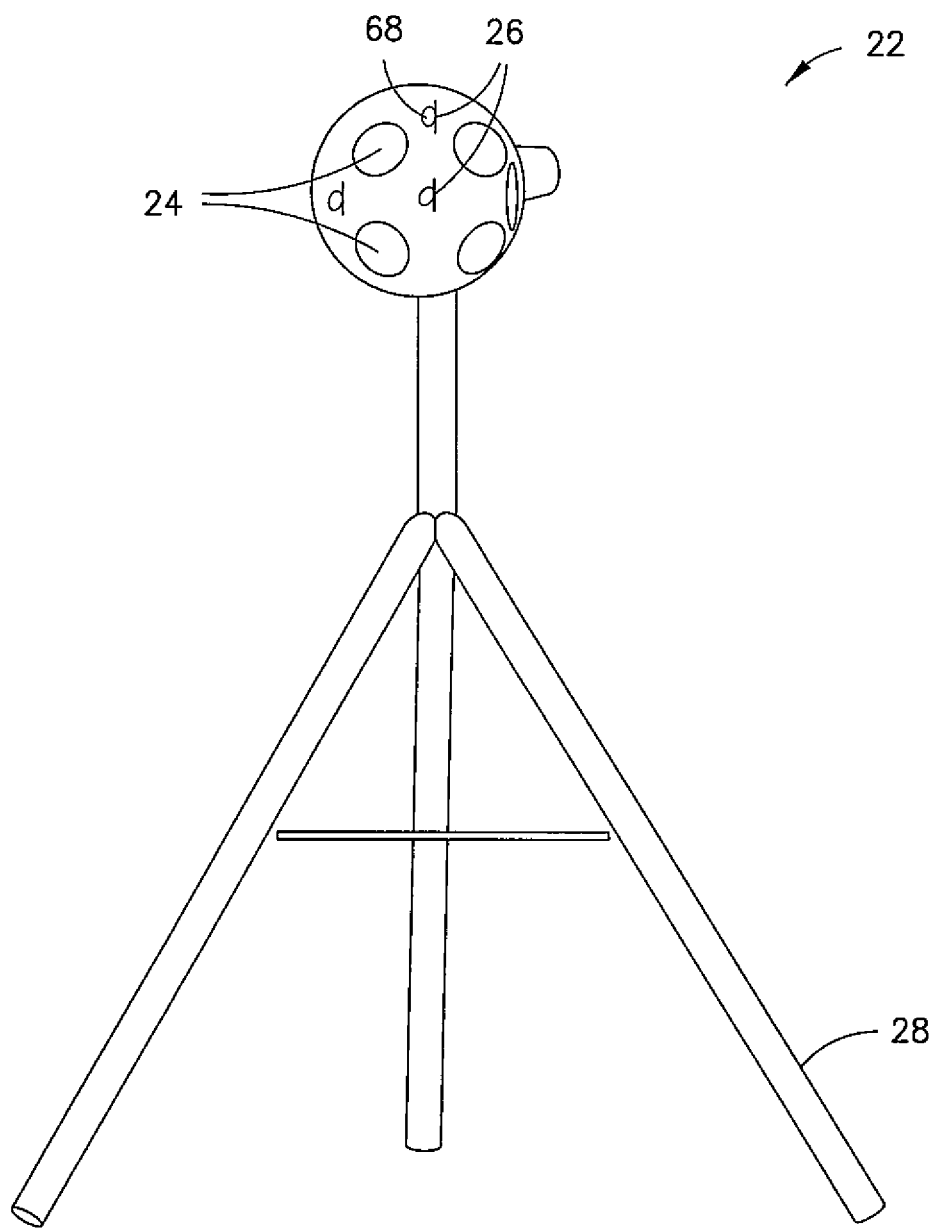
FIG. 2 is a diagram illustrating an example of an omni-directional content capture (OCC) device shown in FIG. 1.

FIG. 2 shows one example of the device 22 wherein the device has multiple cameras 24 and multiple microphones 26 as a unit attached to a tripod 28. One such device is the NOKIA OZO for example. However, in alternate embodiments any suitable recording device or plural devices may be provided for device 22, and device 22 might not comprise a camera.

Figure 3:
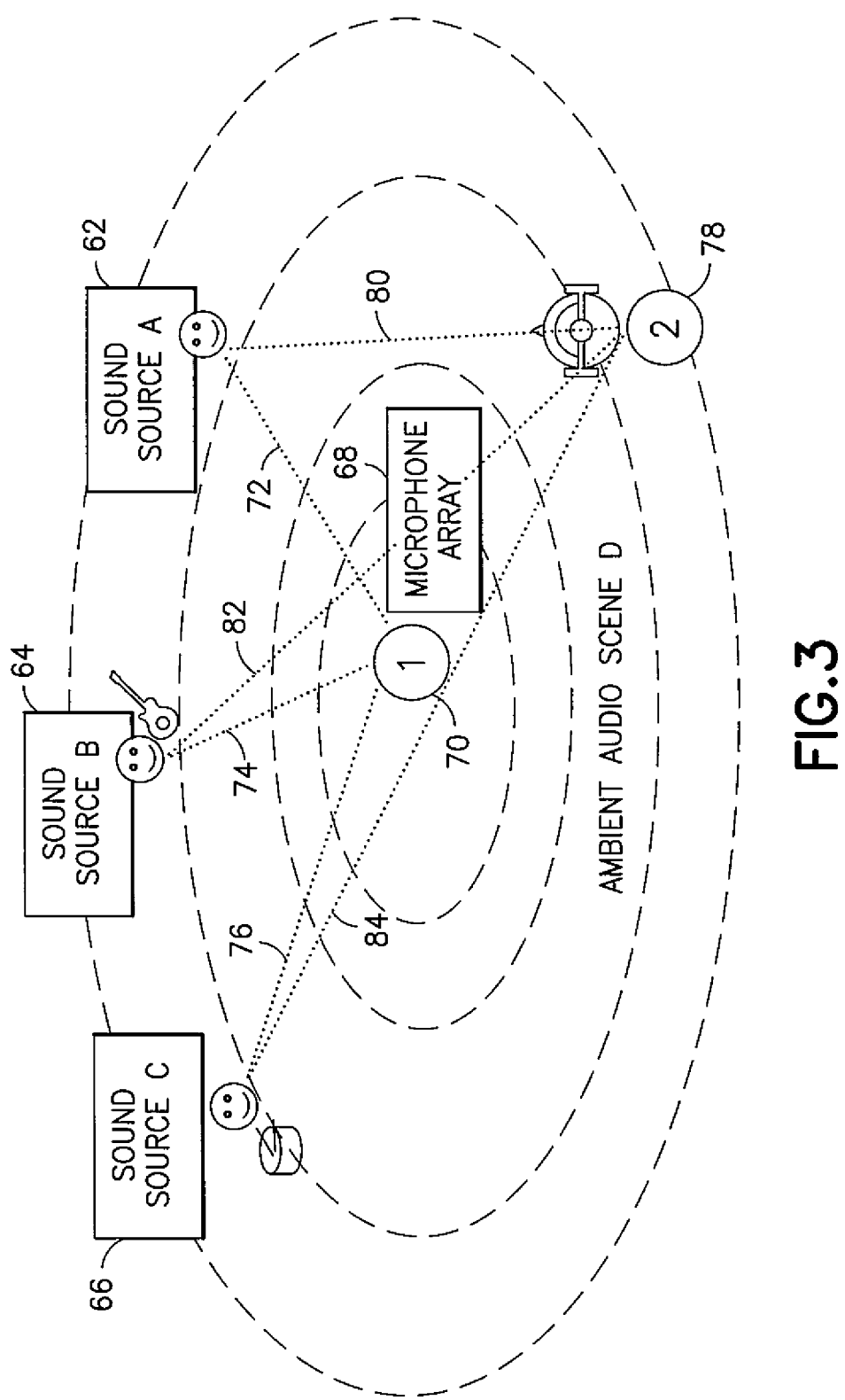
FIG. 3 is a diagram illustrating directions of arrivals (DOA) for the situation shown in FIG. 1.

FIG. 3 is a diagram illustrating directions of arrivals (DOA) for the situation shown in FIG. 1.

The scene may be captured by an omnidirectional camera as omnidirectional video (for example, with a 360 video camera, such as the NOKIA OZO) and may be either monoscopic or stereoscopic. The positions of sound sources and objects of interest may be captured using a positioning technique, such as high-accuracy-indoor-positioning (HAIP). The audio signals of the sound sources may be captured with microphones external to the omnidirectional camera. The VR capture may be monitored and controlled by devices (and or systems) associated with a production crew. Monitoring of the VR capture may be performed with an AR device to visualize the capture scene and modify the capture parameters in real-time based on, for example, instructions provided by the production crew via the AR device. Examples of capture parameters include volume, position, equalizer (EQ), etc.

Figure 5:
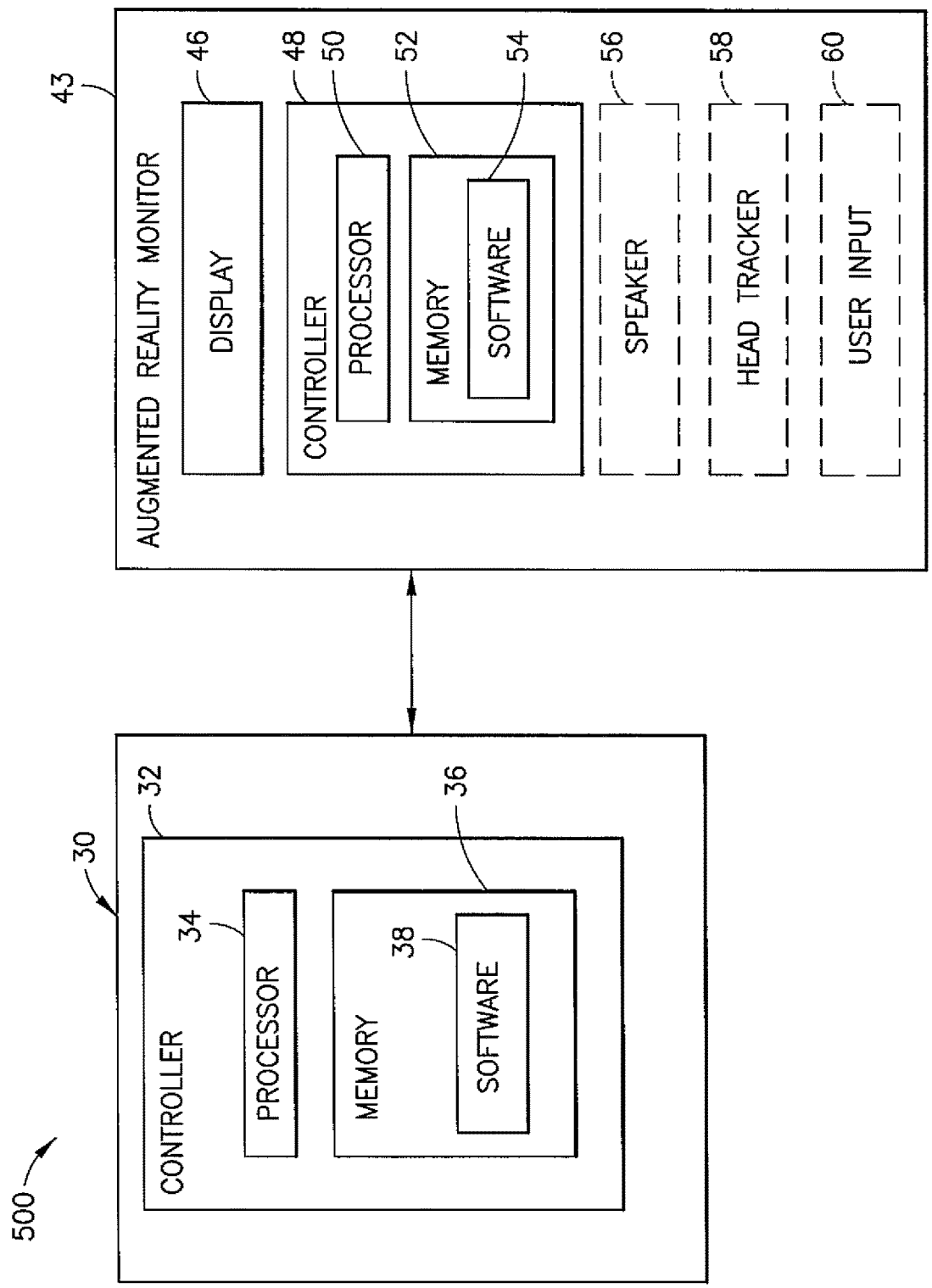
FIG. 5 is a diagram illustrating some components of an streamed content updating device shown in FIG. 1 and an apparatus for missing audio signals.

Referring to FIG. 3, audio objects (sound source A, sound source B, sound source C) 62, 64, 66 are shown corresponding to the sound from the performers and instruments 10, 12 and 18, and 14 and 20, respectively, as recorded by the microphone array 68 of the device 22 at a first observation point 70. Ambient audio is also shown as D. Lines 72, 74, 76 illustrate a direction of arrival (DOA) of the sound from the audio objects (A, B, C) 62, 64, 66 to the microphone array 68 at the first observation point 70 at the event space 16. The user 40 is illustrated at location 78 corresponding to a second observation point. Thus, the direction of arrival (DOA) of the sound from the audio objects (A, B, C) 62, 64, 66 is perceived as illustrated by lines 80, 82, 84. In FIG. 5, wherein the location of the user 40 has changed to a new location 78', the direction of arrival (DOA) of the sound from the audio objects (A, B, C) 62, 64, 66 is perceived as illustrated by lines 80', 82', 84'.

Figure 4:
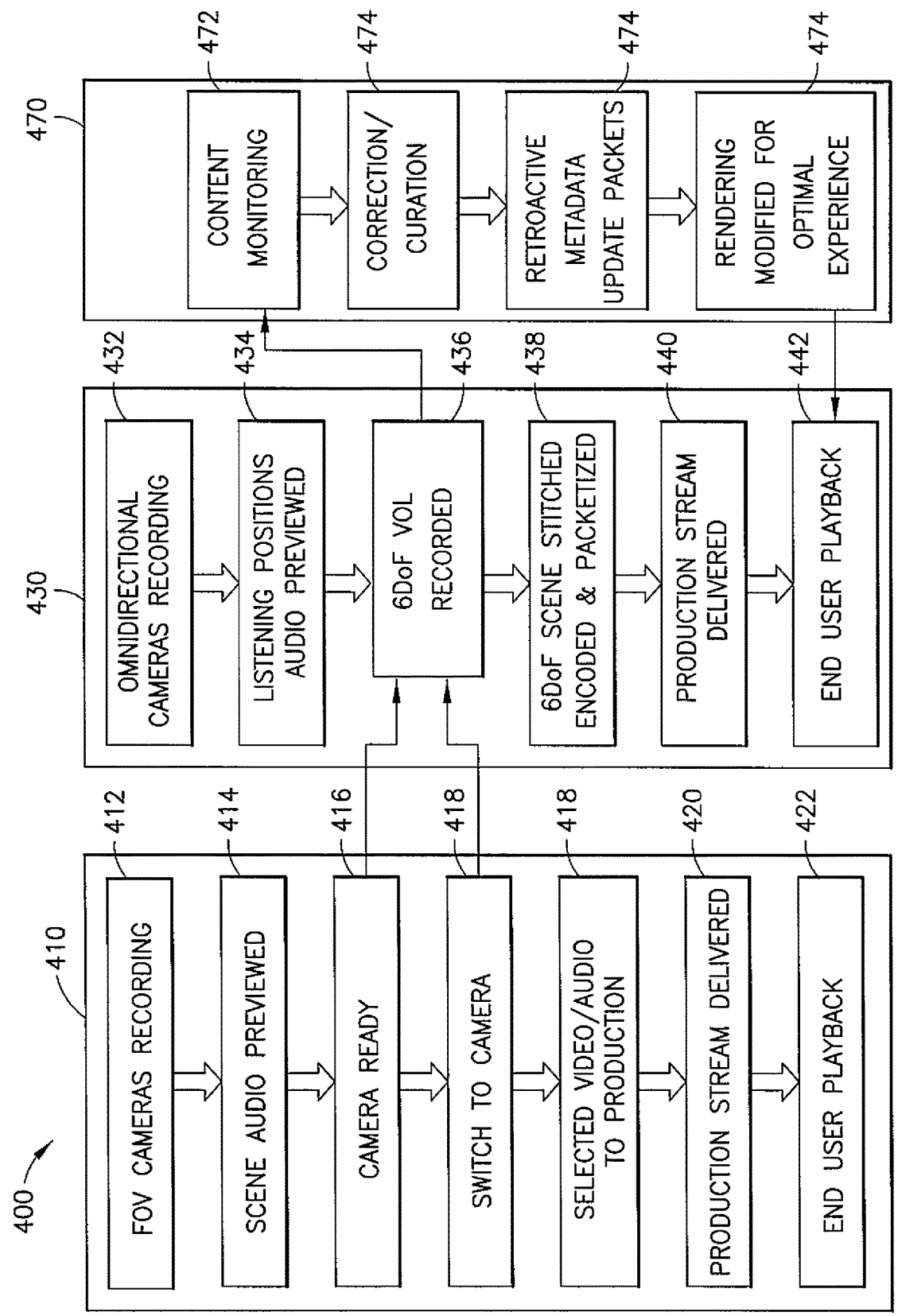
FIG. 4 is a diagram illustrating parallelized workflow.

FIG. 4 is a diagram illustrating a parallelized workflow 400 corresponding to VR capture workflow and a parallelized content capture curation workflow.

As shown in FIG. 4, the parallelized workflow 400 may include a field of view camera workflow 410, a VR capture workflow 450 and a parallelized content capture curation workflow 470. Parallelized workflow 400 may correspond to (or be implemented for) a live VR production scenario monitored with low-latency AR/VR monitoring/mixing and VR streaming, such as shown above in FIG. 1. The content viewed by the audio or video mixing engineer in the AR or localized VR mode may be less delayed than the content in the VR production stream. The VR production stream with the changes (enacted in the AR mode) may be audible/visible with a delay of multiple seconds.

View camera workflow 410 may include limited field of view multi-camera production techniques. At block 412, a director may receive all (or a plurality of) feeds beforehand (for example, on a monitor screen, now shown in FIG. 4). The director may preview the scene audio at block 414. Subsequently, at block 416, the director may alert each camera-operator to be ready (for example, camera 1) a predetermined time (for example, a few seconds) before switching to that particular viewpoint. The director may then switch the production view to that particular view (at block 418). The selected camera and audio feeds may be sent to a production stream for encoding and packetization at block 420. The production stream may be delivered at block 422 and end user playback may occur at block 424. The audio may be static, for example, for a single viewpoint. Consequently, once the audio has been adjusted and tested, the sound scene may be expected to "stay ok" for a subsequent interval (unless there is a significant scene change). This may be followed by periodic checks to ensure proper audio-visual quality experience.

VR capture workflow 450 may implement VR content production. At block 452, omnidirectional cameras may record video and audio. A selection (for example a few) of listening positions audio may be previewed at block 454. At block 456, a six-degrees-of-freedom (6DoF) volume may be recorded. A 6DoF audio visual scene may be stitched, encoded and packetized at block 458. The production stream may be delivered at block 460. User playback may end (for example, based on user input) at block 462. Due to the complexity of a VR capture scene with multiple dynamic sound sources, unplanned changes may occur in the capturing environment. These changes may be due to the omnidirectional nature of the content. In some instances, content producers may realize that the planned parameters do not suit well for a particular situation. To ensure that the content consumed by the end user is as desired by the content creator, a monitoring function may be inserted in the VR capture workflow 450.

Parallelized content capture curation workflow 470 may include content monitoring at block 472 based on the 6DoF volume. At block 474, correction or curation may be implemented. At block 476, retroactive metadata update packets may be generated. A rendering may be modified for optimal experience at block 478 (without causing additional delays) with user playback ending at block 462.

However, the view camera workflow 410, VR capture workflow 450 and parallelized content capture curation workflow 470 may include characteristics that may result in problems and/or inefficiencies. For example, the large amount of delay in production of content may be unutilized for review. Streaming content update system 30, as shown in FIG. 5, may parallelize the content capture and curation phase in such a way that the monitoring function induced delay is masked from the end user 40.

Referring also to FIG. 5, signals from the device 22 may be transmitted to an apparatus (associated with a streaming content capture and update system) 30, such as to be recorded and updated. The signals may be audio signals or audio/visual signals. The apparatus 30 comprises a controller 32 which includes at least one processor 34 and at least one memory 36 including software or program code 38. The apparatus 30 is configured to be able to parallelize the content capture and curation phase in such a way that the monitoring function induced delay is masked from the end user 40. In this example the user 40 is shown outside the event space 16. However, the user may be located at the event space 16 and may move around the event space (and, in some embodiments, into the event space).

Apparatus 30 (or associated devices) may implement a process to incorporate low latency monitoring or capture phase changes to the content which has already been transmitted/delivered to the rendering device, but before the content is consumed/viewed/heard by the user 40. Capturing phase change refers to modifications in the capture parameters when the capture is in progress. Examples of phase changes may include changes in the position of an audio source from what it was recorded using a manual or automated tracking method, modifying the gain level of an audio source, etc. Low latency refers to substantially real-time viewing/hearing of VR content. This is relative to the production time for VR content. Apparatus 30 may implement a process to incorporate changes or fixes to the content in the post-production or curation phase before the final delivery or transmission of content. In other words, apparatus 30 may utilize low latency monitoring to effect a change in the rendering before consumption but after encoding. Minimal additional latency may be required to enable the monitoring function. Additional latency may have a deleterious impact on the user experience, when viewed in combination with broadcast content.

As shown in FIG. 5, headphones, such as the headphones 42 reality headset 44 shown in FIG. 1 (not shown in FIG. 5), may be schematically illustrated as being at least part of the augmented reality (AR) monitor 43 which includes a display 46 and a controller 48. The controller 48 comprises at least one processor 50 and at least one memory 52 comprising software or program code 54. The augmented reality (AR) monitor 43 may comprise one or more speakers 56, a head tracker 58 and a user input 60. However, one or more of these could be provided separately.

Apparatus 30 may process capture parameter changes to determine the impacted audio objects or sources in the VR capture scene. Apparatus 30 may store the capture parameter change information and the corresponding timestamp(s) or temporal intervals. Apparatus 30 may encode this information as actionable metadata and packetize the information with the corresponding VR stream content index to generate a retroactive correction packet (RCP). The VR stream may be delayed compared to the capture time, due to the various delays before the content is delivered to the end user 40. The VR stream creation delay may include computational delay, buffering delay in stitching the video captured from individual camera modules in OZO-like devices and encoding the visual content for compression (for example, a codec such as H.264, H.265, defined by the International Telecommunications Union (ITU) etc.). Apparatus 30 may generate a delivery format (for example, a streaming format compatible with MPEG-DASH (Dynamic Adaptive Streaming over HTTP), Hypertext transfer protocol (HTTP Live Streaming, Real time transport protocol (RTP)/user datagram protocol (UDP) based streaming or digital video broadcasting second generation terrestrial (DVB-T2)/DVB-H (Handheld)/advanced television systems committee (ATSC) broadcast). The encapsulated RCP may contain the delivery stream compliant timestamp or index information.

Apparatus 30 may derive correction update messages for modifying the capture parameters to more closely align or correspond with the content creator's requirements in order to provide low latency messages to the content consumers' playback device, which retroactively fix the audio rendering. Apparatus 30 may implement this approach that enables leveraging the content capture, stitching and packetization latency in VR production for monitoring as well as curating the content. Apparatus 30 may thereby provide an apparatus and implement a method for masking the content correction time from the end user 40, while ensuring an optimal (from the perspective of the content creator) content consumption experience.

In live streaming, content capture operators (such as an audio engineer, lights engineer, video engineer, director, etc.) may perform corrections to the various aspects of recording. For example, the content capture operators may change the automatic position tracking with manual changes, make a certain sound source louder/quieter, increase lighting in some regions, etc. Corresponding parameters, such as a parameter associated with an automatic position tracking with manual changes, a parameter associated with a volume of a sound source, and a parameter associated with lighting in a region, etc., may be determined. In pursuance of these functions, the content capture operator may rewind back slightly, fix an error in positioning, and then communicate the fix to the error forward.

The signaling may be done via delivering a correction packet at low latency to the player over a suitable transport (Session Initiation Protocol (SIP) INFO, real time control transport protocol (RTCP) APP packet, or be contained in a separate render update metadata stream.

The signaling message may contain at least one of the following information in addition to the media segment index or the rendering time of the impacted multimedia content. At least one modification parameter (for example, change in position of an audio object, relative gain, etc.), a render-time effect (for example, spatial extent, Room Impulse Response). The signaling message may contain a number of units (in terms of time, number of protocol data units (PDUs) depending on the delivery format). For example, in case of RTP streaming, the signaling message may consist of the RTP sequence number or render timestamps in case of MPEG-DASH segments.

A receiver with the end user may align the update packet with the corresponding media rendering segment for processing. Subsequently, a player associated with the end user may interpret and effect the changes specified in the metadata correction packet. In instances in which the correction metadata does not arrive before the corresponding segment, the effect may be continued for the duration of the residual effective period. In other words, the receiver device may be configured to continue a modification associated with a previous correction update message in response to a determination that a current correction update message has not arrived.

In some example embodiments, the player may request a metadata update track over the network while consuming locally stored content.

In yet another example embodiment, the metadata update process may be applied to the broadcast content with a TV or any suitable receiver device performing the render-time correction. Thus, a correction corresponding to the consumed content is made (for example, by an automated process or a content capture operator), the correction may be stored as special correction metadata with timecode instead of re-encoding the stream.

Figure 6:
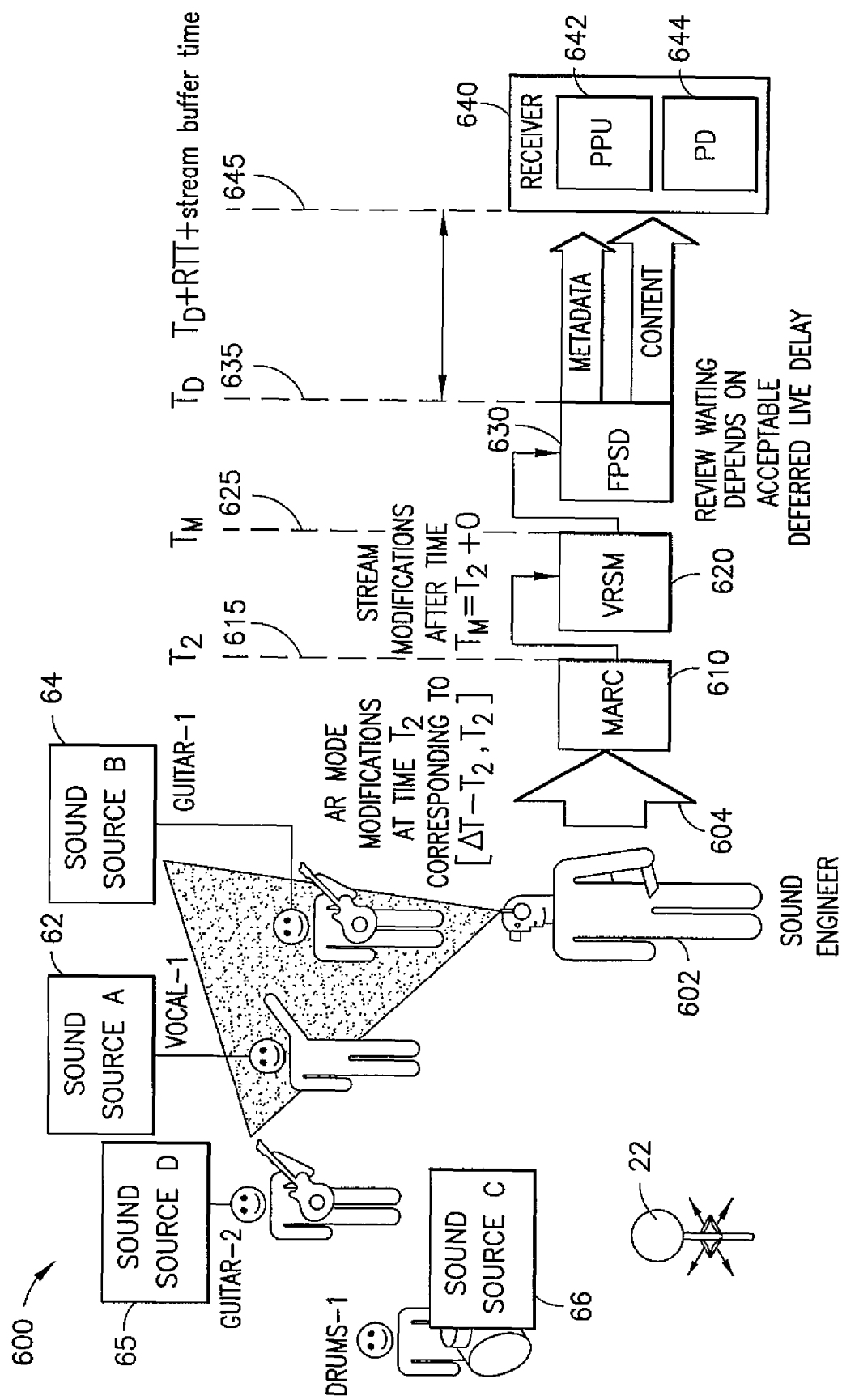
FIG. 6 is a diagram illustrating AR mode mixing and VR stream update workflow.

Referring also to FIG. 6, is a diagram illustrating an AR mode mixing and VR stream update workflow 600. As shown in FIG. 6, AR mode mixing and VR stream update workflow 600 may include a sound engineer component 604 or other control, a Modified AR capture component (MARC) 610, a VR stream modifier (VRSM) 620, a final production stream delivery component (FPSD) 630 and a receiver 640, which may correspond to user 40.

AR mode mixing and VR stream update workflow includes a sound engineer component 604 (or other content capture operator) that may being monitoring the content at 604. As shown in FIG. 6, workflow 600 may be implemented for performing parameter changes and subsequently delivering the reviewed changes as metadata update packets for the delivered VR stream. The content may include sound sources (by way of example, as shown in FIG. 6, a sound source A 62, such as a vocalist 10, and a sound source B 64, such as a guitar 18, selected from among sound sources including sound source D 66).

The changes performed by the sound engineer component 602 (for example, input by a device associated with a sound engineer) in AR mode may be applied retroactively using the processes for updating the stream described herein above. A temporal window of retroactive changes may depend at least on a stream creation time, transmission and playback delay. In some embodiments, the temporal window of retroactive changes may optionally also depend on the waiting period before delivery.

Modified AR capture 610 (at time T2 (615)) may implement AR mode modifications at time $T_2$ corresponding to [$\Delta T - T_2$, $T_2$]. AR mode changes performed by a crew member (at time $T_2$) (for example, a sound engineer) may be sent to the VR stream modifier (or generator) 620. The delay intervals may be leveraged for performing the corrections before the stream is consumed by the end-user 40.

VR stream modifier 620, at time $T_M$ 625, may perform stream modifications after time $$T_M = T_2 + \sigma.$$

Final production stream delivery component 630 may perform review (implementing processes determined by apparatus 30) depending on acceptable deferred live delay at time $T_D$ 635. The receiver 640 may receive metadata 632 from final production stream delivery component 630, at time $T_D$+RTT/2+stream buffer time 645, that may correspond to a playback parameter update (PPU) 642, where RTT is the round trip time. Receiver 640 may perform playback (via a playback device (PD) 644) of content 634 received from final production stream delivery component 630.

Figure 7:
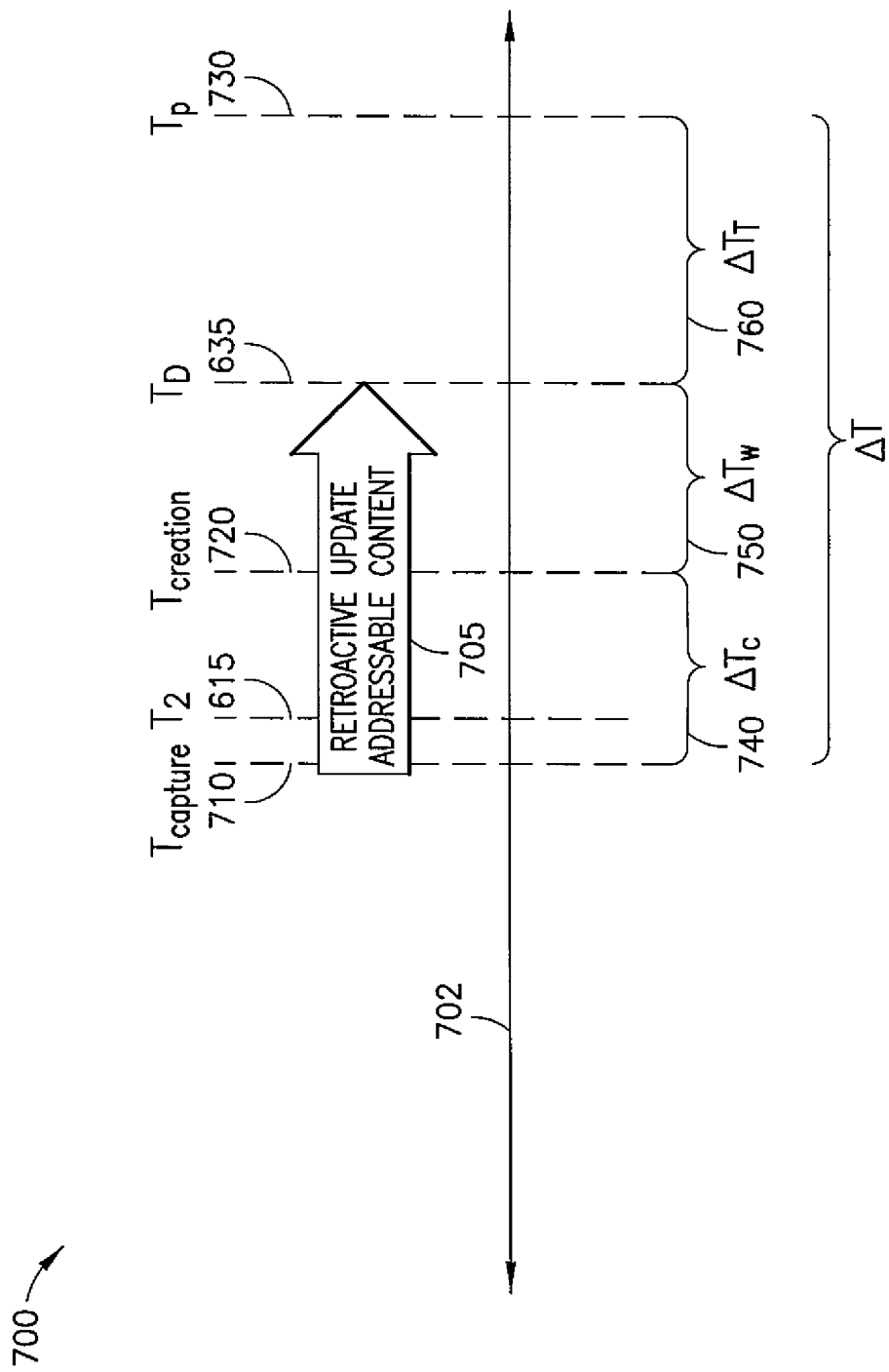
FIG. 7 is a diagram illustrating delay intervals between content capture and content playback.

Referring now to FIG. 7, a diagram 700 illustrating delay intervals between content capture and content playback is shown.

As shown in FIG. 7, different delay intervals may provide upper-bounds for the updates to be created and delivered. The entry point may be $T_{capture}$ (710), a time when the content is available or seen by the monitoring user. A retroactive update for addressable content may be sent at time $T_{capture}$ to time $T_D$.

In instances of AR monitoring, the expected delay from time $T_{capture}$ to $T_2$ 615 may be in the range of a maximum few hundred milliseconds. This may be followed by $T_{creation}$ 720, which may correspond to a time when a delivery-ready VR stream has been generated after performing (in some instance, all) preceding required steps (for example, stitching, encoding, packetization, etc.). The time $T_D$ 635 is the delivery timestamp when the content delivery starts. The gap between $T_{creation}$ 720 and $T_D$ 635 may be governed by application specific constraints or regulatory requirements. For example, in the United States, the federal communications commission (FCC) has a regulation of few seconds of deferred live transmission of events. The $T_{playback}$ 730 may correspond to the playback or rendering time.

The window for "rewinding" the content may be defined as a sum of the delays ($\Delta T_C$ 740, $\Delta T_W$ 750, $\Delta T_T$ 760) from capture time to the playback time, which are.

$$\Delta T = \Delta T_C + \Delta T_W + \Delta T_T; \text{ where}$$

$$\Delta T_C = T_{creation} - T_{capture}$$

$$\Delta T_W = T_{delivery} - T_{capture}$$

$$\Delta T_T = T_{playback} - T_{delivery}$$

The determined parameter $\Delta T$, may be signaled to the monitoring engineer/director for updating the stream in a manner which provides smooth glitch-free production and delivery workflow.

Figure 8:
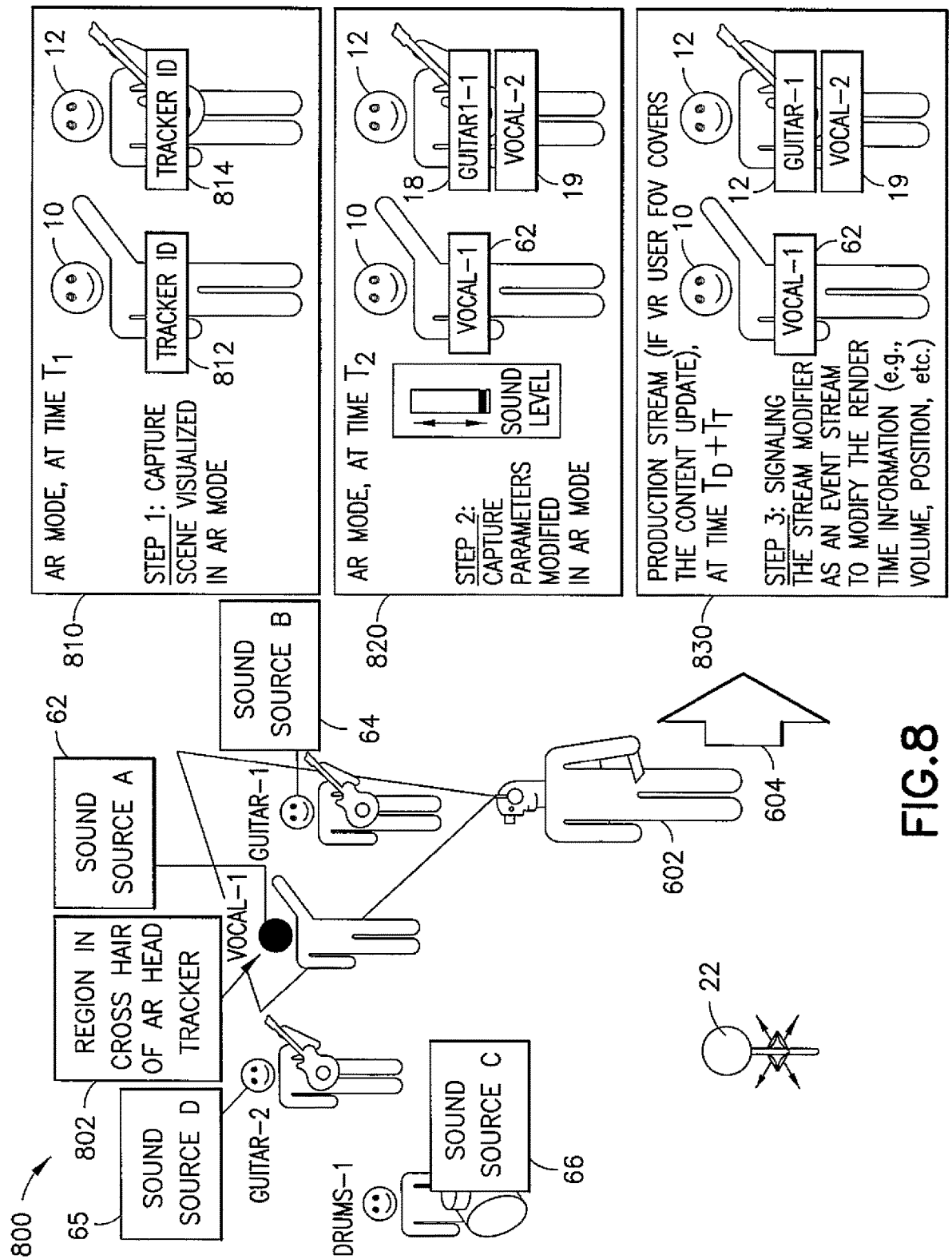
FIG. 8 is a diagram illustrating a view of the capture scene in AR mode and the VR stream.

FIG. 8 is a diagram 800 illustrating a view of the capture scene in AR mode and the VR stream.

FIG. 8 illustrates AR modifier user views and VR stream impact. The changes performed in AR mode may be signaled to the playback device before the rendering time (leveraging the latency between the capture and consumption time). Render time options may include a sound source position, volume, reverb, etc. At step 1, AR mode view 810 may present a visualization of a scene including tracked objects 10, 12, 18 with tracker-ID 812, 814 or labels. At time $T_2$, as shown in AR Mode view 820, a sound engineer may change capture parameters such as sound level (shown, by way of example, as 822 in AR Mode view 820), position, sound spatial extent, EQ, etc. The performed changes may be indicated without noticeable delay in the AR view.

At step 3, shown in AR mode view 830, the production stream may include updates (if VR user FOV covers the content update), at time $T_D$+$T_T$. The changes may be delivered to a metadata update packet generator, for example associated with apparatus 30. If the VR stream watching user is facing towards (for example, the user's field of view in the HMD is overlapping with the change affected area 650 at time $T_2$+$\Delta t$), the user may experience the updated rendering information instead of a sub-optimal rendering that the user may have experienced if the metadata update packet had not arrived beforehand.

Figure 9:
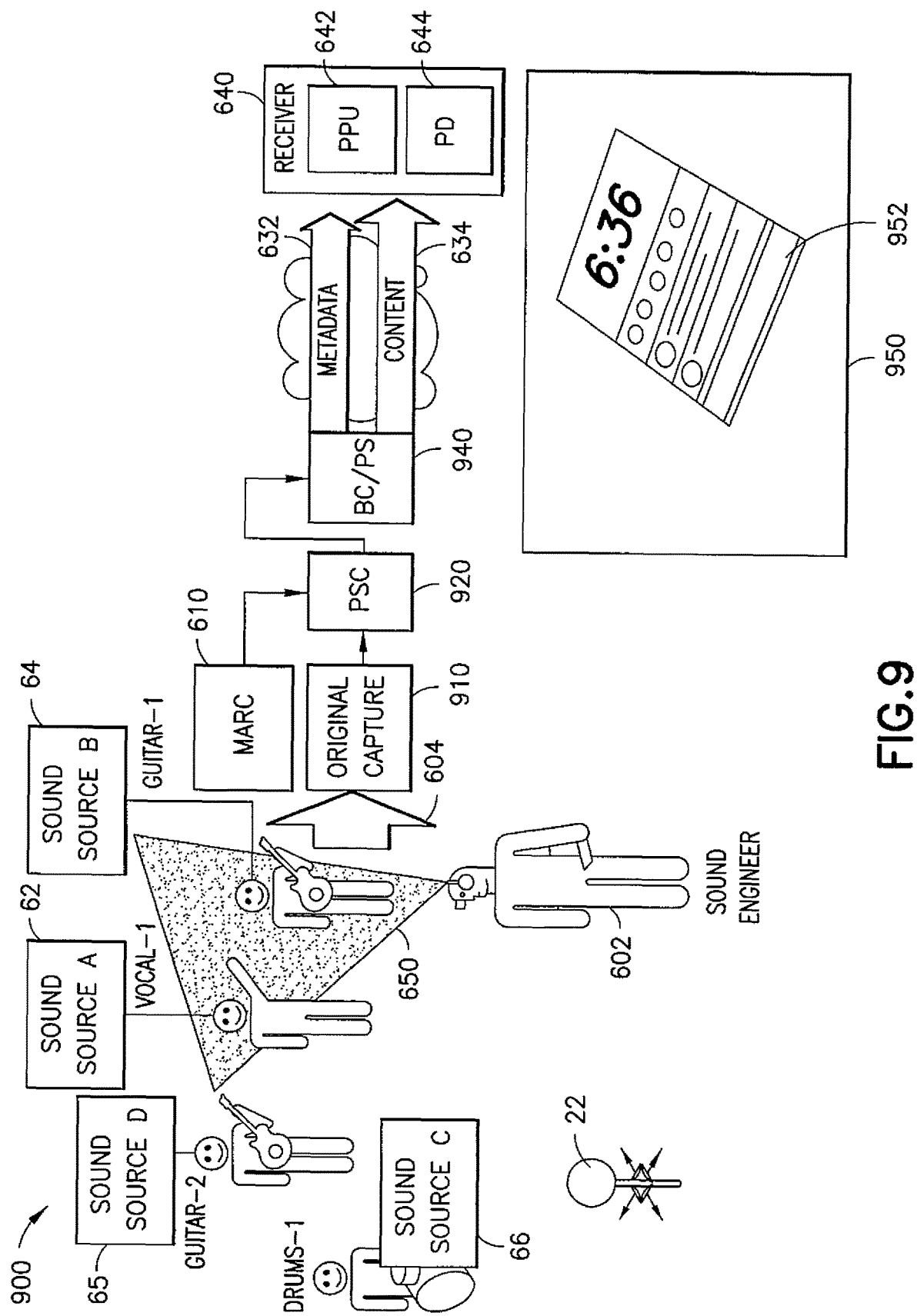
FIG. 9 is a diagram illustrating Metadata update implementation embodiment taking into account different playback settings and delivery options.

FIG. 9 illustrates a situation 900 in which the user specifies their preference to obtain additional metadata update stream.

As shown in FIG. 9, metadata update implementation may incorporate (for example, take into account) different playback settings and delivery options based on input to player settings that instruct the system to use rendering updates if available that are applied via a graphical user interface (GUI), such as GUI 952 of a user device, such device 950, shown in the inset of FIG. 9. The original capture 910 of content may be processed with production stream creation (PSC) 920, which may include Modified AR capture (time $T_2$), such as described hereinabove. Broadcast/production stream (BC/PS) delivery 930 may transmit metadata 632 and/or content 634 via a unicast or multicast transmission and broadcast 950 (for example, IP unicast+Broadcast (DVB, DAB) Or IP unicast+IP Broadcast or IP multicast+ any broadcast). A receiver 640 (for example, a device such as device 950, shown in inset of FIG. 9) may play the content with corresponding playback parameter updates.

Figure 10:
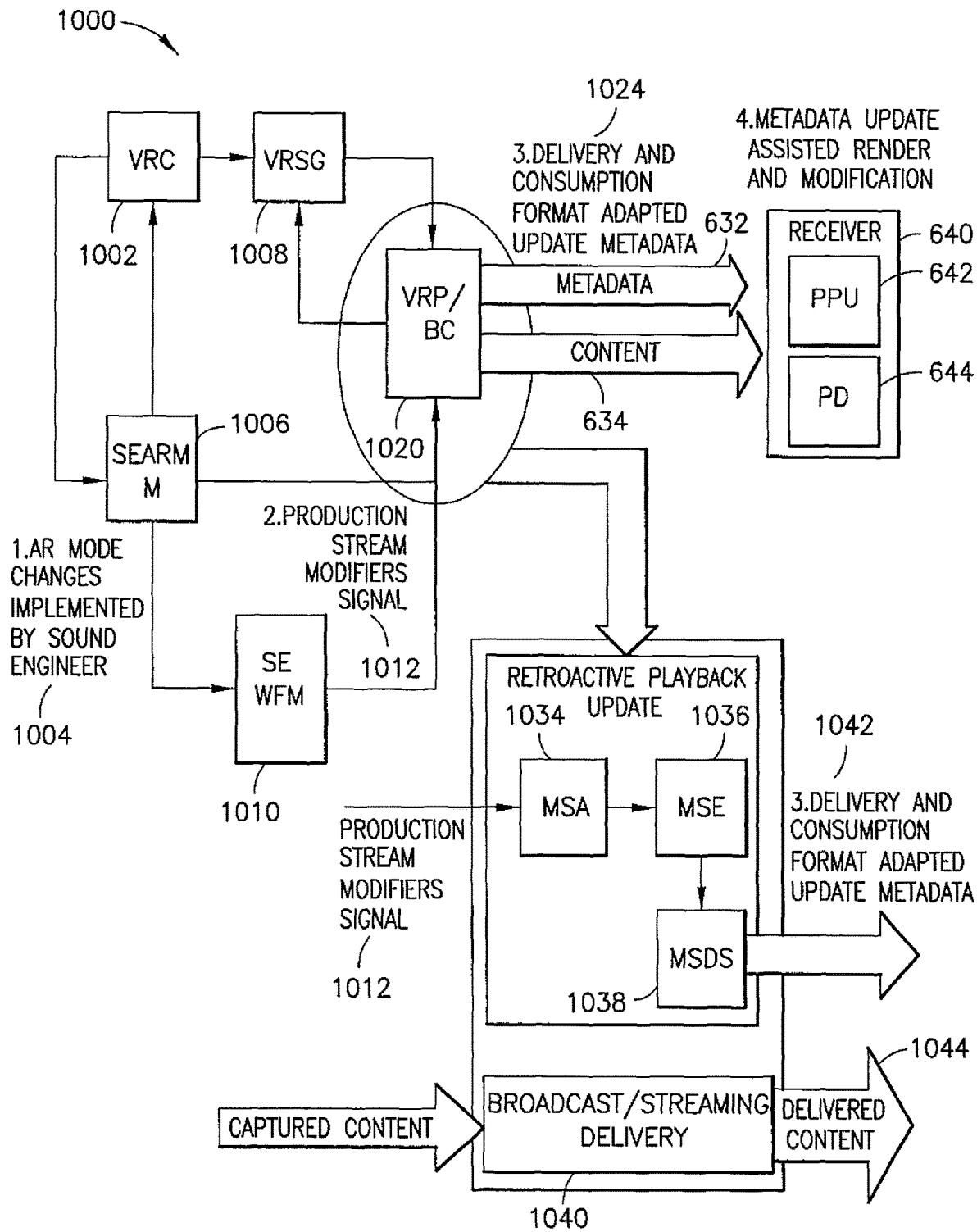
FIG. 10 is a diagram illustrating a system for updating streamed content.

FIG. 10 illustrates a simplified system overview 1000 for implementing updating of the stream.

The VR capture (VRC) module may receive the content from microphones and omnidirectional video cameras (1002). At step 1, AR Mode changes may be implemented by a sound engineer (1004) via an SE AR Mode Monitor (SEARMM) (1006). The AR mode monitor may perform (execute the process) with low latency to provide a real-time overview of the capture scene to the user (for example, a sound engineer). The monitoring user may perform (or input) determined (or required/necessary) changes which may be sent, for example, via production stream modifiers signal at step 2, to the VR production/broadcast stream delivery module (VRP/BC) 1020 (which may be responsible for generating the production VR stream, for example, in conjunction with VR stream generator (VRSG) 1008). VR production/broadcast stream delivery module 1020 may also receive (for example, via a sound engineer) workflow messaging (SE WFM) 1010.

VR production/broadcast stream delivery module 1020 (for example, with VR stream generator 1008) may be correction-metadata-capable. VR stream generator 1008 may take the capture parameter change information which have been transformed to obtain the correct adaptation corresponding to the desired change (for example, the position axis of sound objects may be aligned if the position axis is different from the AR mode coordinate axis), and encapsulate the data 1024 into the delivery compliant format at step 3 (for example, in case of RTP use sequence numbers and MPEG-DASH utilize the segment presentation timestamps). VR production/broadcast stream delivery module 1020 may output the metadata 632, and, in some instances content 634, to receivers associated with end users 40.

As shown with regard to VR production/broadcast stream delivery module 1020-1, VR production/broadcast stream delivery component 1020 may include a retroactive playback update component 1032. VR production/broadcast stream delivery module 1020-1 may receive production stream modifiers signal 1012, as shown at step 2, from a sound engineer (1006) and perform modifier signals adaptation (for example, via modifier signals adaptation module (MSA) 1034), modifier signals encapsulation (for example, via modifier signals encapsulation module (MSE) 1036), and modifier signal delivery scheduling (for example, via modifier signal delivery scheduling module (MSDS) 1038). Delivery and consumption format adapted update metadata (such as metadata 632) may be output at step 3. The captured content may be processed and output (1044) via conventional broadcast streaming delivery (1040).

According to an example embodiment, at step 4, VR production/broadcast stream delivery module 1020 may output the formatted metadata and content to a receiver 640, such as described hereinabove with respect to FIG. 6. Finally the receiver 640 may schedule the metadata update after taking into account when the stream delivery will start and also an expected RTT.

Figure 11:
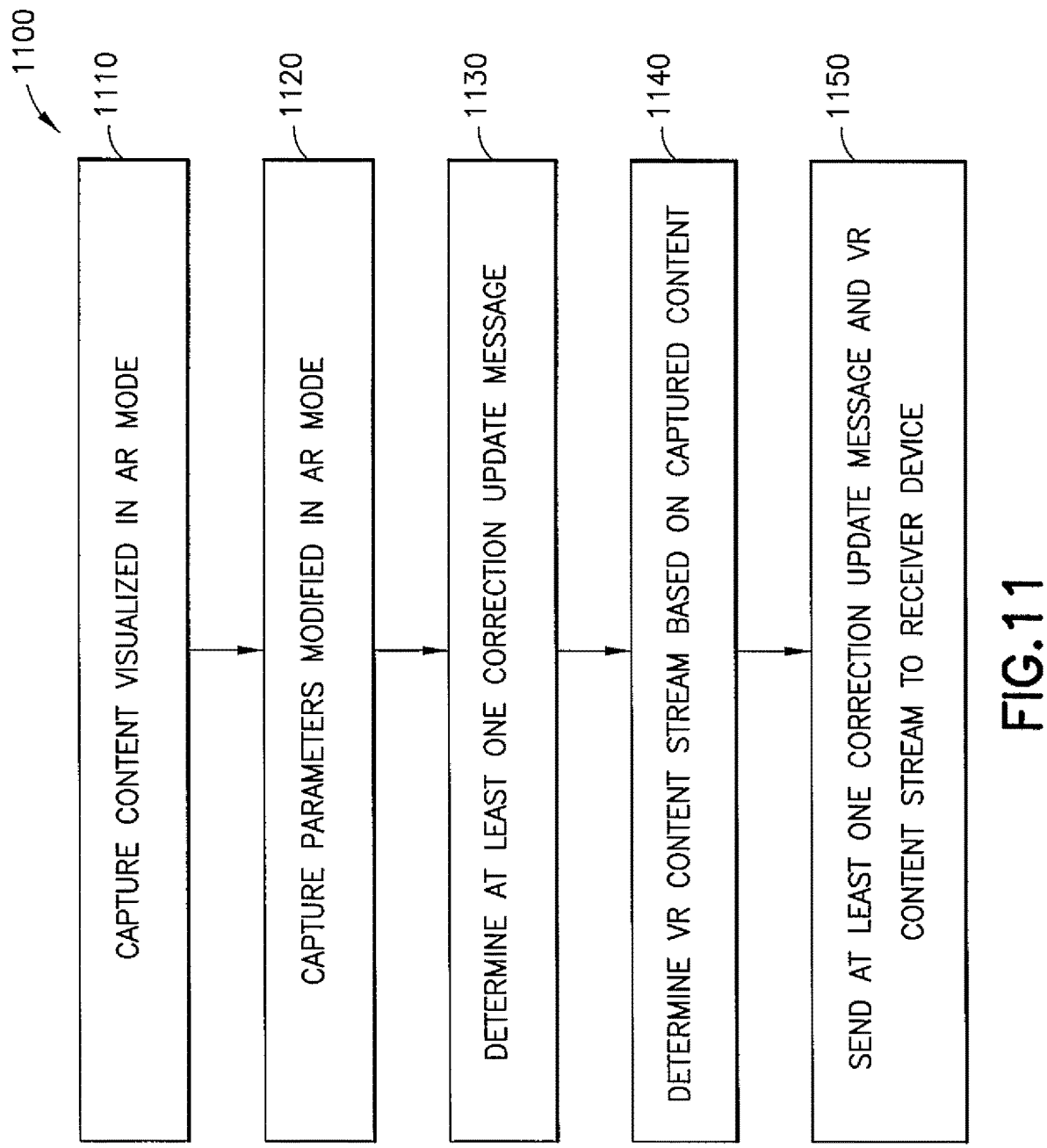
FIG. 11 is a diagram illustrating an example method.

FIG. 11 is an example flow diagram illustrating a process 1100 of updating streaming content. Process 1100 may be performed by a device (or devices) associated with a sound engineer, including, for example, streaming content update system 30 and/or AR monitor 43.

At block 1110, streaming content update system 30 may capture content visualized in augmented reality (AR) mode.

At block 1120, streaming content update system 30 may capture parameters modified in the AR mode. For example, the sound engineer may modify parameters in the AR mode. Streaming content update system 30 may capture the resulting modifications.

At block 1130, streaming content update system 30 may determine at least one correction update message for modifying the capture parameters based on the captured parameters modified in the AR mode.

At block 1140, streaming content update system 30, or for example, an associated rendering system, may determine a content stream based on the captured content. The content stream or production stream may be a final stream ready for delivery to a device associated with the end user.

At block 1150, streaming content update system 30 may send the at least one correction update message and the content stream to a receiver device. Streaming content update system 30 may store and/or share, to make the retroactive fix available to the end user consumption device. The receiver device may be configured to align the content stream and the captured parameters modified in the AR mode. The system may thereby modify a stream which is produced with relatively high latency compared to the monitoring latency. This modified stream may be the final stream delivered to the end user.

Features as described herein allow for utilizing a delay in VR content production compared to limited FOV content delivery for updating metadata for a VR rendering. The delay in VR content production may be required for live events (for example, contemporaneousness or currency of the VR content may make the live broadcast stream suitable for consumption for the end users). The currency of the VR stream with other forms of content that may be available may be a (in some instances, crucial) business driver (for example, a VR stream provided as a second screen content for conventional primary broadcast content).

The streaming content update system 30 may provide technical advantages and/or enhance the end-user experience. For example, the streaming content update system 30 may mask a content capture phase monitoring and fixing process by parallelizing the workflow such that VR stream delivery is not unnecessarily delayed.

Another benefit of streaming content update system 30 is to allow for modifying and fixing capture phase issues, which may be important for complex distributed audio capture scene with multiple dynamic sound sources of interest.

Features as described herein may plug in with the existing VR content delivery systems (for example, the streaming content update system 30 may be an add-on to a VR streaming content delivery system).

Another benefit of streaming content update system 30 and the methods of updating VR streaming content described hereinabove is to provide a work-around from re-encoding by leveraging object based distributed audio capture delivery. This refers to utilizing object based capture of audio and delivering individual audio objects as different audio streams. This may make it easier to modify the individual audio source rendering properties at playback time.

An example method may comprise capturing, by a low latency monitoring device, content visualized in video rendering mode, capturing at least one parameter modified in the video rendering mode, determining at least one correction update message for modifying the captured content based on the at least one captured parameter modified in the video rendering mode, determining a content production stream based on the captured content, sending the content production stream to a receiver device, and sending the at least one correction update message to the receiver device is configured to retroactively fix an audio rendering of the captured content based on aligning the content production stream and the at least one captured parameter modified in the video rendering mode.

The method, wherein the video rendering mode comprises an augmented reality (AR) mode and capturing content visualized in the video rendering mode further comprises capturing the content visualized in the AR mode at a shorter delay than content in the content production stream, wherein the content production stream comprises a virtual reality (VR) production stream.

The method may include a monitoring function induced delay associated with the low latency monitoring device is masked from the receiver device.

The method may include a VR capture workflow associated with the VR content production stream that is parallelized with a content capture curation workflow associated with the at least one correction update message.

The method wherein VR capture workflow includes at least one of stitching, encoding, and packetization.

The method may include, when capturing the at least one parameter modified in the video rendering mode further comprises capturing at least one of a parameter associated with an automatic position tracking with manual changes, a parameter associated with a volume of a sound source, and a parameter associated with lighting in a region.

The method wherein the at least one correction update message is included in at least one of a Session Initiation Protocol (SIP) INFO message, real time control transport protocol (RTCP) APP packet, and a separate render update metadata stream.

The method wherein the at least one correction update message includes at least one of a modification parameter, a render-time effect, and a number of units.

The method wherein the receiver device is further configured to continue a modification associated with a previous at least one correction update message in response to a determination that the at least one correction update message has not arrived.

The method wherein sending the at least one correction update message further comprises sending the at least one correction update message in response to a request associated with the receiver device.

An example apparatus may comprise at least one processor; and at least one non-transitory memory including computer program code, the at least one memory and the computer program code configured to, with the at least one processor, cause the apparatus to: capture, by an augmented reality (AR) device, content visualized in AR mode, capture parameters modified in the AR mode, determine at least one correction update message for modifying the capture parameters based on the captured parameters modified in the AR mode, determine a VR content production stream based on the captured content, and send the at least one correction update message and the content stream to a receiver device, wherein the receiver device is configured to retroactively fix an audio rendering of the content based on aligning the VR content production stream and the captured parameters modified in the AR mode.

The apparatus wherein, when capturing content visualized in the AR mode, the at least one memory and the computer program code are configured to, with the at least one processor, cause the apparatus to capture the content visualized in the AR mode at a shorter delay than content in a virtual reality (VR) production stream.

The apparatus wherein a monitoring function induced delay associated with the apparatus is masked from the receiver device.

The apparatus wherein a VR capture workflow associated with the VR content production stream is parallelized with a content capture curation workflow associated with the at least one correction update message.

The apparatus wherein the VR capture workflow includes at least one of stitching, encoding, and packetization.

The apparatus wherein, when capturing parameters modified in the AR mode, the at least one memory and the computer program code are configured to, with the at least one processor, cause the apparatus to capture at least one of a parameter associated with an automatic position tracking with manual changes, a parameter associated with a volume of a sound source, and a parameter associated with lighting in a region.

The apparatus wherein the at least one correction update message is included in at least one of a Session Initiation Protocol (SIP) INFO message, real time control transport protocol (RTCP) APP packet, and a separate render update metadata stream.

The apparatus wherein the at least one correction update message includes at least one of a modification parameter, a render-time effect, and a number of units.

The apparatus wherein, when sending the at least one correction update message, the at least one memory and the computer program code are configured to, with the at least one processor, cause the apparatus to send the at least one correction update message in response to a request associated with the receiver device.

An example apparatus may be provided in a non-transitory program storage device, such as memory 52 shown in FIG. 3 for example, readable by a machine, tangibly embodying a program of instructions executable by the machine for performing operations, the operations comprising: capturing, by an augmented reality (AR) device, content visualized in AR mode, capturing parameters modified in the AR mode, determining at least one correction update message for modifying the capture parameters based on the captured parameters modified in the AR mode, determining a VR content production stream based on the captured content, and sending the at least one correction update message and the content stream to a receiver device, wherein the at least one correction update message is configured to be used by the receiver device to retroactively fix an audio rendering of the captured content based on aligning the content production stream and the at least one captured parameter modified in the video rendering mode.

In accordance with another example, an example apparatus comprises: means for capturing, by an augmented reality (AR) device, content visualized in AR mode, means for capturing parameters modified in the AR mode, determining at least one correction update message for modifying the capture parameters based on the captured parameters modified in the AR mode, means for determining a VR content production stream based on the captured content, and means for sending the at least one correction update message and the content stream to a receiver device, wherein the at least one correction update message is configured to be used by the receiver device to retroactively fix an audio rendering of the captured content based on aligning the content production stream and the at least one captured parameter modified in the video rendering mode.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
capturing, with a low latency monitoring device, audio and video content of a live event visualized in a video rendering mode, using at least one camera, a plurality of microphones of the low latency monitoring device and at least one microphone external to the low latency monitoring device;
capturing at least one audio-related parameter associated with, at least in part, the audio and video content;
modifying the at least one audio-related parameter, wherein the at least one modified audio-related parameter is configured to modify, at least in part, the audio and video content;
determining, with the low latency monitoring device, at least one correction update message based on the at least one modified audio-related parameter;
determining, with the low latency monitoring device, a content production stream based on the captured content;
sending the content production stream to a receiver device; and
sending the at least one correction update message to the receiver device during streaming of the live event that generates the audio and video content visualized in the video rendering mode, wherein the at least one correction update message is configured to be used at the receiver device to retroactively adjust an audio rendering of the captured audio and video content at playback time associated with a content creation latency, based on aligning the content production stream and the at least one modified audio-related parameter in the video rendering mode, during the streaming of the content production stream of the live event.

2. A method as in claim 1, wherein the video rendering mode comprises an augmented reality (AR) mode and capturing content visualized in the video rendering mode further comprises:
capturing the content visualized in the AR mode at a shorter delay than content in the content production stream, wherein the content production stream comprises a virtual reality (VR) production stream.

3. A method as in claim 1, wherein a monitoring function induced delay associated with the low latency monitoring device is masked from the receiver device that plays back the content production stream.

4. A method as in claim 1, wherein a virtual reality (VR) capture workflow associated with the content production stream and a content capture curation workflow associated with the at least one correction update message run in parallel.

5. A method as in claim 4, wherein the VR capture workflow includes stitching, encoding, and packetization.

6. A method as in claim 1, wherein capturing the at least one audio-related parameter associated with, at least in part, the audio and video content further comprises:
capturing at least one of a parameter associated with an automatic position tracking with manual changes of a content creator.

7. A method as in claim 1, wherein the at least one correction update message is included in at least one of a Session Initiation Protocol (SIP) INFO message, a real time control transport protocol (RTCP) APP packet, or a separate render update metadata stream.

8. A method as in claim 1, wherein the at least one correction update message includes at least one of a modification parameter, a render-time effect, or a number of units.

9. A method as in claim 1, wherein the receiver device is further configured to continue with a modification associated with a previous at least one correction update message in response to a determination that the at least one correction update message has not arrived.

10. A method as in claim 1, wherein sending the at least one correction update message further comprises:
sending the at least one correction update message in response to a request associated with the receiver device.

11. A method as in claim 1, wherein:
the modifying of the at least one audio-related parameter occurs during monitoring of the content for VR live streaming; and
the modifying of the at least one audio-related parameter is performed manually with a content creator, based on one or more requirements of the content creator.

12. A method as in claim 1, wherein the content creation latency comprises a time between a creation and playback of the content production stream, the content creation latency further comprising:
a difference between a content creation time and a content capture time;
a difference between a content delivery time and the content capture time; and
a difference between a content playback time and the content delivery time.

13. A method as in claim 1, where capturing, with the low latency monitoring device, the audio and video content of the live event visualized in the video rendering mode further comprises:
monitoring individual sound objects that generate the audio content within the live event with the at least one microphone external to the low latency monitoring device to capture a portion of the audio content;
monitoring a portion of the audio content comprising an ambient sound scene using the plurality of microphones of the low latency monitoring device, the plurality of microphones being a microphone array; and capturing, with the low latency monitoring device, the audio and video content of the live event visualized in the video rendering mode using a plurality of cameras of the low latency monitoring device.

14. A method as in claim 1, further comprising receiving a signal indicating the content creation latency, the content creation latency being a time between a generation of the content production stream and playback of the content production stream.

15. A method as in claim 1, wherein capturing the at least one audio-related parameter associated with, at least in part, the audio and video content further comprises:
capturing at least one of a parameter associated with a volume of a sound source, or a parameter associated with lighting in a region.

16. A method as in claim 1, wherein:
the content production stream comprises a virtual reality production stream;
sending the content production stream to the receiver device comprises sending the virtual reality production stream to the receiver device; and
sending the at least one correction update message to the receiver device comprises sending the at least one correction update message to the receiver device during the streaming of the virtual reality production stream of the live event.

17. A method as in claim 16, wherein the video rendering mode comprises an augmented reality mode.

18. An apparatus comprising:
at least one processor; and
at least one non-transitory memory including computer program code, the at least one memory and the computer program code configured to, with the at least one processor, cause the apparatus to:
capture, with a low latency monitoring device, audio and video content of a live event visualized in a video rendering mode, using a plurality of microphones of the low latency monitoring device;
receive at least one input from at least one camera and at least one microphone external to the low latency monitoring device to further capture the audio and video content;
capture at least one audio-related parameter associated with, at least in part, the audio and video content;
modify the at least one audio-related parameter, wherein the at least one modified audio-related parameter is configured to modify, at least in part, the audio and video content;
determine, with the low latency monitoring device, at least one correction update message based on the at least one modified audio-related parameter;
determine, with the low latency monitoring device, a content production stream based on the captured content;
send the content production stream to a receiver device; and
send the at least one correction update message to the receiver device during streaming of the live event that generates the audio and video content visualized in the video rendering mode, wherein the at least one correction update message is configured to be used at the receiver device to retroactively adjust an audio rendering of the captured audio and video content at playback time associated with a content creation latency, based on aligning the content production stream and the at least one modified audio-related parameter in the video rendering mode, during the streaming of the content production stream of the live event.

19. An apparatus as in claim 18, wherein the video rendering mode comprises an augmented reality (AR) mode and, when capturing content visualized in the video rendering mode, the at least one memory and the computer program code are configured to, with the at least one processor, cause the apparatus to:
capture the content visualized in the AR mode at a shorter delay than content in the content production stream, wherein the content production stream comprises a VR production stream.

20. An apparatus as in claim 18, wherein a monitoring function induced delay associated with the apparatus is masked from the receiver device that plays back the content production stream.

21. An apparatus as in claim 18, wherein a virtual reality (VR) capture workflow associated with the content production stream and a content capture curation workflow associated with the at least one correction update message run in parallel.

22. An apparatus as in claim 21, wherein the VR capture workflow includes stitching, encoding, and packetization.

23. An apparatus as in claim 18, wherein, when capturing the at least one audio-related parameter associated with, at least in part, the audio and video content, the at least one memory and the computer program code are configured to, with the at least one processor, cause the apparatus to:
capture at least one of a parameter associated with an automatic position tracking with manual changes of a content creator.

24. An apparatus as in claim 18, wherein the at least one correction update message is included in at least one of a Session Initiation Protocol (SIP) INFO message, real time control transport protocol (RTCP) APP packet, or a separate render update metadata stream.

25. An apparatus as in claim 18, wherein the at least one correction update message includes at least one of a modification parameter, a render-time effect, or a number of units.

26. An apparatus as in claim 18, wherein, when sending the at least one correction update message, the at least one memory and the computer program code are configured to, with the at least one processor, cause the apparatus to:
send the at least one correction update message in response to a request associated with the receiver device.

27. A non-transitory program storage device readable by a machine, tangibly embodying a program of instructions executable by the machine for performing operations, the operations comprising:
capturing, with a low latency monitoring device, audio and video content of a live event visualized in video rendering mode, using a plurality of microphones of the low latency monitoring device;
receiving at least one input from at least one camera and at least one microphone external to the low latency monitoring device to further capture the audio and video content;
capturing at least one audio-related parameter associated with, at least in part, the audio and video content;
modifying the at least one audio-related parameter, wherein the at least one modified audio-related parameter is configured to modify, at least in part, the audio and video content;
determining, with the low latency monitoring device, at least one correction update message based on the at least one modified audio-related parameter;

determining, with the low latency monitoring device, a content production stream based on the captured content;

sending the content production stream to a receiver device; and sending the at least one correction update message to the receiver device during streaming of the live event that generates the audio and video content visualized in the video rendering mode, wherein the at least one correction update message is configured to be used at the receiver device to retroactively adjust an audio rendering of the captured audio and video content at playback time associated with a content creation latency, based on aligning the content production stream and the at least one modified audio-related parameter in the video rendering mode, during the streaming of the content production stream of the live event.

* * * * *